United States Patent [19]

Menashi et al.

[11] Patent Number: 4,829,033

[45] Date of Patent: May 9, 1989

[54] BARIUM TITANATE POWDERS

[75] Inventors: Jameel Menashi; Robert C. Reid, both of Lexington; Laurence Wagner, North Reading, all of Mass.

[73] Assignee: Cabot Corporation, Waltham, Mass.

[21] Appl. No.: 150,792

[22] Filed: Feb. 1, 1988

Related U.S. Application Data

[63] Continuation-in-part of Ser. No. 859,577, May 5, 1986, abandoned.

[51] Int. Cl.$^4$ .................. C04B 35/46; C04B 35/49
[52] U.S. Cl. .................... 501/139; 501/136; 501/137; 501/138; 423/598; 423/619
[58] Field of Search ............... 501/136, 137, 138, 139; 252/62.9; 423/598, 619

[56] References Cited

U.S. PATENT DOCUMENTS

| | | |
|---|---|---|
| 2,758,911 | 8/1956 | Lynd et al. |
| 2,841,503 | 7/1958 | Graham et al. |
| 2,988,422 | 6/1961 | Walsh ................................ 423/598 |
| 3,637,531 | 1/1972 | Faxon et al. ................... 501/137 X |
| 3,647,364 | 3/1972 | Mazdiyasni et al. ............. 260/429.5 |
| 3,725,539 | 4/1973 | Spangenberg ..................... 423/598 |
| 4,058,592 | 11/1977 | Quets ............................ 423/598 X |
| 4,061,583 | 12/1977 | Murata et al. ................. 423/598 X |
| 4,233,282 | 11/1980 | Arendt ............................... 423/598 |
| 4,293,534 | 10/1981 | Arendt ......................... 501/137 X |
| 4,487,755 | 12/1984 | Arendt ............................... 423/598 |
| 4,520,064 | 5/1985 | Uedaira et al. ............... 423/598 OR |
| 4,534,956 | 8/1985 | Arendt et al. .................... 423/598 |
| 4,537,865 | 8/1985 | Okabe et al. ................. 501/137 X |
| 4,543,341 | 9/1985 | Barringer et al. |
| 4,547,355 | 10/1985 | Uedaira et al. ..................... 423/593 |
| 4,643,984 | 2/1987 | Abe et al. ...................... 501/136 X |
| 4,677,083 | 6/1987 | Uedaira et al. ............... 423/598 OR |
| 4,696,810 | 9/1987 | Shirasaki et al. ............... 423/598 X |

FOREIGN PATENT DOCUMENTS

| | | |
|---|---|---|
| 610369 | 12/1960 | Canada . |
| 0141551 | 10/1984 | European Pat. Off. . |
| 0146284 | 11/1984 | European Pat. Off. . |
| 110107 | 6/1983 | Japan . |
| 0039723 | 3/1984 | Japan ................................ 423/598 |
| 0005006 | 1/1985 | Japan ................................ 423/598 |
| 81023 | 5/1985 | Japan . |
| 405340 | 8/1932 | United Kingdom . |
| 530584 | 6/1939 | United Kingdom . |
| 799436 | 11/1955 | United Kingdom . |
| 790093 | 3/1956 | United Kingdom . |
| 853784 | 5/1959 | United Kingdom . |

OTHER PUBLICATIONS

"Preparation of Semiconducting Titanates by Chemical Methods", Gallagher et al., *Journal of the American Ceramic Society,* vol. 46, No. 8, Aug. 21, 1963, pp. 359–365.

"Effect of pH on the Chemical Preparation of Barium–Strontium Titanate", Schrey, *Journal of the American Ceramic Society,* Aug. 1965, vol. 48, No. 8, pp. 401–405.

"Method of Wet Synthesis of Barium Titanate $BaTiO_3$", Kubo et al., *Kogyo Kagaku Zasshi,* 71 (1) (1968), pp. 114–118.

"Preparation of $BaTiO_3$ and Other Ceramic Powders by Coprecipitation of citrates in an Alcohol", Mulder, Ceramic Bulletin, vol. 49, No. 11 (1970), pp. 990–993.

"Synthesis of Fine–Grained Barium Titanate by Hydrothermal Reaction", Kaneko et al., *Nippon Kagaku Kaishi,* 1975 (6), pp. 985–990.

"Hydrothermal Synthesis of $BaTiO_3$", Matsuoka et al., Report of the *Research Laboratory of Hydrothermal Chemistry,* vol. 2, No. 15 (1978).

"Alternate Matrix Material for Molten Carbonate Fuel Cell Electrolyte Structures", Arendt, *J. Electrochem. Soc.: Electro-Chemical Science and Technology,* vol. 129, No. 5, May 1982, pp. 979–983.

"Chemical Preparation of Doped $BaTiO_3$", Stiegelschmitt et al., *Science of Ceramics,* vol. 12, Proceedings of the Twelfth International Conference, Jun. 1983, pp. 151–154.

"The Molten Salt Synthesis of Large Crystal Sized $SrTiO_3$", Arendt et al., General Electric Corporate Research and Development, Technical Information Series, No. 86CRD006, Feb. 1986, pp. 1–5.

"Easily Sinterable $BaTiO_3$ Powder", Abe et al., Sakai Chemical Industry Co., Ltd.

*Primary Examiner*—William R. Dixon, Jr.
*Assistant Examiner*—Karl Group
*Attorney, Agent, or Firm*—Lawrence A. Chaletsky

[57] ABSTRACT

Barium titanate based dielectric compositions having the general formula $Ba_{(1-x-x'-x'')}Pb_xCa_{x'}Sr_{x''}Ti_{(1-y-y'-y'')}Sn_yZr_{y'}Hf_{y''}O_3$, wherein x, x', x'' and y, y', y'' represent mole fractions of the divalent and tetravalent cations and x and x' have independent value greater than 0.01 and less than 0.3 and x'', y, y' and y'' have independent values greater than zero and less than 0.3, such that the sum (x+x'+x'') is greater than 0.01 and less than 0.4 and the sum (y+y'+y'') does not exceed 0.4. Regardless of the specific composition selected, the products of the invention have a mean primary particle size in the range of 0.05 to 0.4 microns with a very narrow particle size distribution. The products are dispersible so that the mean particle size determined by image anaylsis and by sedimentation are comparable.

9 Claims, 1 Drawing Sheet

BARIUM TITANATE POWDERS

This application is a continuation-in-part of application Ser. No. 859,577, filed May 5, 1986, now abandoned.

FIELD OF ART

This invention relates to barium titanate based dielectric compositions and, more particularly, relates to stoichiometric, dispersible, submicron barium titanate or coforms, with very narrow particle size distributions.

BACKGROUND OF THE ART

The high dielectric constant and strength of barium titanate make it an especially desirable material from which capacitors, condensers, and other electronic components can be fabricated. Especially attractive is the fact that barium titanate's electrical properties can be controlled within a wide range by means of mixed crystal formation and doping.

The very simple cubic perovskite structure exhibited by barium titanate is the high temperature crystal form for many mixed oxides of the $ABO_3$ type. This crystal structure consists of a regular array of corner-sharing oxygen octahedra with smaller titanium(IV) cations occupying the central octahedral B site and barium(II) cations filling the interstices between octahedra in the larger 12-coordinated A-sites. This crystal structure is of particular significance since it is amenable to a plethora of multiple cation substitutions at both the A and B sites so that many more complex ferrolectric compounds can be easily produced.

Barium titanate's relatively simple lattice structure is characterized by the $TiO_6$-octahedra which, because of their high polarizability, essentially determine the dielectric properties of the structure. The high polarizability is due to the fact that the small Ti(IV) ions have relatively more space within the oxygen octahedra. This cubic unit cell, however, is stable only above the Curie point temperature of about 130° C. Below 130° C., the Ti(IV) ions occupy off-center positions. This transition to the off-center position results in a change in crystal structure from cubic to tetragonal between temperatures of 5° and 130°, to orthorhombic between −90° C. and 5° C. and finally to rhombohedral at temperatures less than −90° C. Needless to say, the dielectric constant and strength also decreases relative to these temperature and crystal structure changes.

The dielectric constant of barium titanate ceramic has a strong temperature dependence and exhibits a pronounced, maximum dielectric constant at or around the Curie point. In view of the temperature dependence of the dielectric constant and its relatively low value at room temperature, pure $BaTiO_3$ is rarely used in the production of commercial dielectric compositions. Hence, in practice, additives are employed to upgrade the dielectric properties of barium titanate. For example, it is known in the art that the Curie temperature can be shifted to lower temperatures and broadened by effecting a partial substitution by strontium and/or calcium for barium and by zirconium and/or tin for titanium, thereby resulting in materials with a maximum dielectric constant of 10,000 to 15,000 at room temperature. Alternatively, the Curie temperature can be increased by a partial substitution of lead(II) for barium. Additionally, the substitution of small amounts of other metallic ions of suitable size but with valencies which are different to those of barium and titanium, as summarized in B. Jaffee, W. R. Cook, Jr. and H. Jaffe, "Piezoelectric Ceramics", Acedemic Press, N.Y. 1971, can cause profound changes in the nature of the dielectric properties.

In commercial practice, barium titanate based dielectric powders are produced either by blending the required pure titanates, zirconates, stannates and dopants or by directly producing the desired dielectric powder by a high temperature solid state reaction of an intimate mixture of the appropriate stoichiometric amounts of the oxides or oxide precursors (e.g., carbonates, hydroxides or nitrates) of barium, calcium, titanium, etc. The pure titanates, zirconates, stannates, etc. are also, typically, produced by a high temperature solid phase reaction process. In such calcination processes the required reactants are wet milled to accomplish the formation of an intimate mixture. The resulting slurry is dried and calcined at elevated temperatures, ranging from about 700° to 1200° C., to attain the desired solid state reactions. Thereafter, the calcine is remilled to produce a dispersible powder for use in making green bodies.

Although the barium titanate based dielectric formulations produced by solid phase reactions are acceptable for many electrical applications, they do suffer from several disadvantages. Firstly, the milling step serves as a source of contaminants which can adversely affect electrical properties. Compositional inhomogenieties on a microscale can lead to the formation of undesirable phases, such as barium orthotitanate, which can give rise to moisture sensitive properties. Moreover, during calcination substantial particle growth and interparticle sintering can occur. As a consequence, the milled product consists of irregularly shaped fractured aggregates which have a wide particle size distribution ranging from about 0.2 up to 10 microns. Published studies have shown that green bodies formed from such aggregated powders with broad aggregate size distributions require elevated sintering temperatures and give sintered bodies with broad grain size distributions. In the production of complex dielectric bodies, however, such as monolithic multilayer capacitors, there is a substantial economic advantage to employing lower sintering temperatures rather than higher sintering temperatures, since the percentage of lower cost silver in the silver-palladium electrode can be increased as the sintering temperature is reduced.

As is known in the art, the capacitance of a dielectric layer is inversely proportional to its thickness. In current multilayer capacitors, the dielectric layer thickness is of the order of 25 microns. Although very desirable, this value cannot be substantially reduced because as layer thickness is decreased the number of defects in the dielectric film, such as pin holes, increases. The defects adversely affect the performance of the capacitor. One major source of such defects is the presence of undispersed aggregates having sizes comparable with the film thickness. During sintering, because of the presence of such aggregates, non-uniform shrinkage occurs and pin holes are formed. Hence, utilization of barium titanate based dielectric formulations formed by solid state reactions significantly increases the overall manufacturing cost of monolithic multilayer capacitors.

In view of the limitations of the product rendered by conventional solid state reaction processes, the prior art has developed several other methods for producing barium titanate. These methods include the thermal decomposition of barium titanyl oxalate and barium titanyl citrate and the high temperature oxidation of atomized solutions of either barium and titanium alcoholates dissolved in alcohol or barium and titanium lactates dissolved in water. In addition, barium titanate has been produced from molten salts, by hydrolysis of barium and titanium alkoxides dissolved in alcohol and by the reaction of barium hydroxide with titania both hydrothermally and in aqueous media. Because the product morphologies derived from some of these processes approach those desired here, the prior art has attempted to produce barium titanate based compositions with the same methods used to produce pure barium titanate. For example, B. J. Mulder discloses in an article entitled "Preparation of $BaTiO_3$ and Other Ceramic Powders by Coprecipitation of Citrates in an Alcohol", Ceramic Bulletin, 49, No. 11, 1970, pages 990–993, that $BaTiO_3$ based compositions or coforms can be prepared by a coprecipitation process. In this process aqueous solutions of Ti(IV), Zr(IV) and/or Sn(IV) citrates and formates of Ba(II), Mg(II), Ca(II), Sr(II) and/or Pb(II) are sprayed into alcohol to effect coprecipitation. The precipitates are decomposed by calcination in a stream of air diluted with $N_2$ at 700°–800° C. to give globular and rod shaped particles having an average size of 3 to 10 microns.

Barium titanate based coforms have been prepared by precipitation and subsequent calcination of mixed alkali metal and/or Pb(II) titanyl and/or zirconyl oxalates as disclosed by Gallagher et al. in an article entitled "Preparation of Semi-Conducting Titanates by Chemical Methods", J. Amer. Ceramic Soc., 46, No. 8, 1963 pages 359–365. These workers demonstrated that $BaTiO_3$ based compositions in which Ba is replaced by Sr or Pb in the range of 0 to 50 mole percent or in which Ti(IV) is replaced by Zr(IV) in the range of 0 to 20 mole percent may be produced.

Faxon et al. discloses in U.S. Pat. No. 3,637,531 that $BaTiO_3$ based coforms can be synthesized by heating a solution of a titanium chelate or a titanium alkoxide, an alkaline earth salt and a lanthanide salt to form a semi-solid mass. The mass is then calcined to produce the desired titanate coform.

In each of the prior art references cited above, however, calcination is employed to synthesize the particles of the barium titanate based coforms. For reasons already noted this elevated temperature operation produces aggregated products which after comminution give smaller aggregate fragments with wide size distributions.

The prior art has also attempted to circumvent the disadvantages of conventionally prepared $BaTiO_3$ powders by synthesizing a mixed alkaline earth titanate-zirconate composition through a molten salt reaction. Such a process is disclosed in U.S. Pat. No. 4,293,534 to Arendt. In the practice of this process titania or zirconia or mixtures thereof and barium oxide, strontium oxide or mixtures thereof are mixed with alkali metal hydroxides and heated to temperatures sufficient to melt the hydroxide solvent. The reactants dissolve in the molten solvent and precipitate as an alkaline earth titanate, zirconate or a solid solution having the general formula $Ba_xSr_{(1-x)}Ti_yZr_{(1-y)}O_3$. The products are characterized as chemically homogeneous, relatively monodisperse, submicron crystallites. This method is limited, however, in that it can only produce Sr and/or Zr containing coforms.

Hydrothermal processes have also been described in which coforms are produced. Balduzzi and Steinemann in British Pat. No. 715,762 heated aqueous slurries of hydrated $TiO_2$ with stoichiometric amounts of alkaline earth hydroxide to temperatures between 200° and 400° C. to form mixed alkaline earth titanates. Although it was stated that products of any desired size up to about 100 microns could be produced, it is doubtful that, other than in the case of Sr-containing coforms, products with the morphological characteristics of this invention could be obtained. This contention is based on the fact that whereas $Ba(OH)_2$ is soluble in aqueous media $Ca(OH)_2$, and $Mg(OH)_2$, especially in the presence of $Ba(OH)_2$, are relatively insoluble. Accordingly, in the case of Ca-containing coforms it has been found that under the experimental conditions of Balduzzi and Steinemann that $BaTiO_3$ is first formed and then $Ca(OH)_2$ reacts with the balance of the unreacted titania to form $CaTiO_3$ during the heating process to 200° to 400° C.

Matsushita et al. in European patent publication No. 0141551 demonstrated that dilute slurries of hydrous titania can be reacted with $Ba(OH)_2$ and/or $Sr(OH)_2$ by heating to temperatures up to 110° C. to produce either $BaTiO_3$ or Sr-containing coforms. The morphological characteristics of these coforms appear to be comparable with those of this invention. The method, however, is again limited to producing only Sr-containing coforms.

A publication of the Sakai Chemical Industry Company entitled "Easily Sinterable $BaTiO_3$ Powder", by Abe et al. discloses a hydrothermal process for synthesizing a barium titanate based coform with the formula $BaTi_{(1-x)}Sn_xO_3$. In this process a 0.6M $Ti_{(1-x)}Sn_xO_2$ slurry, prepared by neutralizing an aqueous solution of $SnOCl_2$ and $TiCl_4$, is mixed with 0.9M $Ba(OH)_2$ and subjected to a hydrothermal treatment at 200° C. for at least five hours. Although not explicitly delineated, Abe et al. imply the slurry was heated to temperature. Although no description of the coform morphology was indicated, the $BaTiO_3$ product produced by the same process had a surface area of 11 $m^2/g$, a particle size of 0.1 microns and appeared to be dispersible. Presumably the Sn-containing coforms have comparable morphologies and are thus comparable with those of this invention. However, Abe et al. is limited in that it teaches only that Sn(IV) can be synthesized into a barium titanate coform. Perhaps, by analogy, it does suggest the use of other tetravalent cations such as Zr(IV) and possibly the use of divalent Sr(II), since, like $Ba(OH)_2$, $Sr(OH)_2$ is quite soluble in aqueous media.

Hence, there is absent in the prior art any coforms of barium titanate which include calcium and/or lead or multiple divalent and tetravalent cation substitutions which are stoichiometric, dispersible, spherical, and submicron with narrow particle size distributions except when these reagents are present at impurity levels. For example, Abe et al. found that their hydrothermally derived $BaTiO_3$ product contained 0.01 weight % Ca and, since not mentioned, probably less than 0.01 weight % Pb. In practice, it can be expected that the amounts of such impurities present in precipitated $BaTiO_3$ and $BaTiO_3$ based dielectric compositions will vary with the source of the reactants employed. From an examination of the purities of a number of typical commercially available reactants or reactant precursors, such as hydrous titania, $TiCl_4$, $TiOSO_4$, $ZrO(NO_3)_2$, $Ba(OH)_2$, $Ba(NO_3)_2$, etc., it is concluded that the levels of either Pb(II) or Ca(II) to be found in prior art precipitated $BaTiO_3$ and $BaTiO_3$ based composition will be, typically, much less than 0.1 weight %. In other words, the mole fraction of Ca(II) or Pb(II) present in such products will be less than 0.006. The effects of such minor levels of Ca(II) and Pb(II) on the dielectric properties, such as the Curie temperature, of these $BaTiO_3$ based compositions is small. In general, the mole fractions of these additives which are present in practical dielectric compositions have values which exceed 0.005 and, more preferably, exceed 0.01.

SUMMARY OF THE INVENTION

The present invention includes a wide variety of dispersible, coforms of barium titanate which are substantially spherical, stoichiometric, and submicron with narrow particle size distributions. Most importantly, the barium titanate based dielectric compositions according to the present invention include those coforms having a partial substitution by divalent lead and/or calcium for the divalent barium as well as coforms in which the divalent barium is partially replaced by lead, calcium and strontium and the tetravalent titanium is partially replaced by tin, zirconium and hafnium.

In one important embodiment of the present invention, the barium titanate based coform is represented by the general formula $Ba_{(1-x-x'-x'')}Pb_xCa_{x'}Sr_{x''}Ti_{(1-y-y'-y'')}Sn_yZr_{y'}Hf_{y''}O_3$ where x, x' and x'' represent the mole fractions of the divalent cations Pb and Ca and have independent values ranging from 0.01 to 0.3 where x' represent the mole fraction of the divalent cation Sr and has independent values ranging from 0 to 0.3 and the sum (x+x'+x'') has a value ranging from 0.01 to 0.4, while y, y' and y'' represent the mole fractions of the tetravalent cations and have independent values ranging from 0 to 0.3 and the sum of (y+y'+y'') has a value ranging from 0 to 0.4.

In another important embodiment of the present invention, the barium titanate coform is represented by the general formula $Ba_{(1-x')}Ca_{x'}Ti_{(1-y-y'-y'')}Sn_yZr_{y'}Hf_{y''}O_3$ wherein calcium is partially substituted for the divalent barium cation and in another important embodiment of the invention the barium titanate dielectric composition is represented by the general formula $Ba_{(1-x)}Pb_xTi_{(1-y-y'-y'')}Sn_yZr_{y'}Hf_{y''}O_3$, wherein lead is substituted for the divalent barium. In each of the latter embodiments, the independent values for the mole fractions x, x', x'' and y, y', y'' are consistent with those already cited for the more complex coform having the general formula $Ba_{(1-x-x'-x'')}Pb_xCa_{x'}Sr_{x''}Ti_{(1-y-y'-y'')}Sn_yZr_{y'}Hf_{y''}O_3$.

Notwithstanding the chemical composition of the coform, each of the barium titanate based coforms of the present invention possess the same unique chemical and physical properties. The barium titanate based dielectric formulations are stoichiometric such that the divalent to tetravalent mole ratio of the varyingly composed coforms is 1.000±0.015 regardless of the number and mole percent of any divalent and tetravalent cation substitutions within the cited limits. Non-stoichiometric compositions, where the divalent to tetravalent cation mole ratio of the varyingly composed coforms is in the range of 0.9 to 1.1, can also be produced. The mean primary particle size of the barium titanate based coforms is in the range of 0.05 to 0.4 microns. Moreover, the mean particle size determined by image analysis is comparable to the mean particle size determined by sedimentation demonstrating that the coforms are dispersible. The size distribution curve of the coform particles, by image analysis, has a quartile ratio less than or equal to 1.5 which establishes that the barium titanate based coforms have a narrow particle size distribution. Additionally significant is the fact that any of the dispersible, submicron barium titanate based dielectric compositions of the present invention can be produced by a single, general hydrothermal process.

Accordingly, it is a primary object of the present invention to provide a dispersible, submicron barium titanate coform with a narrow particle size distribution.

It is another object of the present invention to provide a wide variety of compositions of such $BaTiO_3$ based coforms having primary particle sizes which can be controlled in the size range of 0.05 up to about 0.4 microns.

It is another object of the present invention to provide a wide variety of coforms which are synthesizable by a single general hydrothermal process.

It is another object of the present invention to provide a stoichiometric barium titanate based coform which is substantially free of mill media.

It is another object of the present invention to provide a coform of barium titanate containing a variety of additives which shifts and/or broadens the Curie point to the desired temperature regions and reduces the temperature dependence of the dielectric so formed.

It is another object of the present so invention to provide dispersible $BaTiO_3$ based dielectric compositions which can be used to give dielectric layers of reduced thickness which are substantially defect free.

It is still a further object of the present invention to provide a barium titanate based dielectric formulation which uniformly sinters to a high density at considerably less than conventional temperatures.

BRIEF DESCRIPTION OF THE DRAWINGS

These and other details and advantages of the invention will be described in connection with the accompanying drawings in which.

DESCRIPTION OF THE PREFERRED EMBODIMENT

Figure 1:
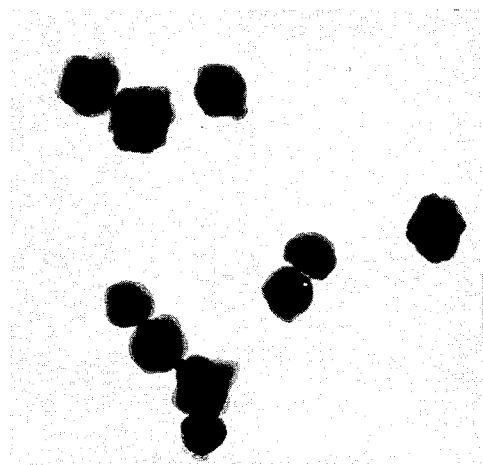
FIG. 1 is a transmission electron micrograph at 50,000x magnification of a stoichiometric, dispersible, submicron complex coform according to the present invention having the general formula $Ba_{0.856}Pb_{0.097}Ca_{0.074}Ti_{0.830}Zr_{0.099}Sn_{0.071}O_3$.

At the outset, the invention is described in its broadest overall aspects, with a more detailed description following. The preferred embodiment of the present invention is a coform of the general type $Ba_{(1-x-x'-x'')}Pb_xCa_{x'}Sr_{x''}Ti_{(1-y-y'-y'')}Sn_yZr_{y'}Hf_{y''}O_3$ wherein x, x' and x'' represent the mole fractions of the divalent cations and x and x' have independent values ranging from 0.01 to 0.3 and, more preferably, from 0.01 to 0.2, x'' has independent values ranging from 0 to 0.3 and, more preferably, from 0 to 0.2 and the sum (x+x'+x'') can have values ranging from 0.01 to 0.4 and, more preferably, from 0 to 0.3, y, y' and y'' represent the mole fractions of the tetravalent cations and have independent values ranging from 0 to 0.3 and, more preferably, from 0 to 0.25 and the sum of (y+y'+y'') have values ranging from 0 to 0.4 and, more preferably, from 0 to 0.3.

When the sums of (x+x'+x") and (y+y'+y") both equal zero the coform simply constitutes barium titanate powder. When x=x"=y=y'=y"=0 and x' is greater than 0, the resulting product is a barium titanate based coform where x' mole fractions of Ba(II) in $BaTiO_3$ have been replaced by Ca(II) to give a product with the nominal formula $Ba_{(1-x')}Ca_{x'}TiO_3$. Conversely, when x'=x"=y=y'=y"=0 and x is greater than zero, the coform has the composition $Ba_{(1-x)}Pb_xTiO_3$.

Since the values of x, x', x", y, y', and y" can each adopt a wide range of values (within the cited limits), many combinations of coforms with a large range of compositions can be prepared. Regardless of which composition is formed, however, each of the barium titanate based coforms is uniquely characterized by its high purity, fine submicron size and narrow particle size distribution.

Preferably, the fine, dispersible submicron powder of the present invention consists of a barium titanate coform having both a tetravalent and a divalent metal ion substitution of between 1 and 30 mole percent. The divalent barium ion or barium and strontium ions can be partially replaced by lead, calcium, or mixtures thereof. Conversely, the tetravalent titanium ion can be partially replaced by tin, zirconium, hafnium or mixtures thereof. Hence, the barium titanate based dielectric compositions of the present invention include simple coforms of barium lead titanate or barium calcium titanate as well as more complex coforms including barium lead stannate titanate and barium lead strontium stannate zirconate titanate. Of course, the selection of the divalent and/or tetravalent cation replacement and the mole percent of the substitution is dependent upon whether the Curie temperature is desired to be raised or lowered as well as by whether the Curie peak is desired to be broadened or shifted. Regardless of which of the wide variety of barium titanate based compositions is formed, however, the barium titanate coforms according to the present invention ar still uniquely identified by the aforementioned morphological and chemical characteristics. Hence, both the simple as well as the complex coforms of barium titanate consist of substantially spherical, dispersible particles having a primary particle size in the range of 0.05 and 0.4 microns with narrow size distributions and a divalent to tetravalent mole ratio of 1.000±0.015, even when both the divalent and tetravalent ions have been replaced by one or more other ions.

The narrow particle size distribution and submicron size of the barium titanate based dielectric compositions make the coforms of the present invention particularly attractive for further application in the production of complex dielectric bodies. Prior studies have established that green bodies formed from unaggregated powders with narrow size distributions will sinter at reduced temperatures and give sintered bodies with a narrow grain size distribution. The economic advantage of employing dielectric formulation with a lower sintering temperature is obvious since the percentage of lower cost silver in the silver-palladium alloy can be increased as the sintering temperature is reduced. In addition, since these $BaTiO_3$ based dielectric compositions are all dispersible and have few aggregates exceeding a size of 1 micron, they can be employed in the formation of dielectric films of reduced thickness. Hence, the spherical unaggregated, submicron and narrowly distributed barium titanate dielectric coform powder of the present invention should be particularly well suited for use in complex dielectric applications requiring sintering.

In most dielectric applications, the preferred products are those in which the variability in primary particle composition is relatively small. In some circumstances, however, compositional inhomogeneities are an advantage. In these instances, the availability of products with varying primary particle size can be utilized to produce a dispersion of two or more powders with differing compositions having either comparable numbers of primary particles or substantially different numbers of primary particles. Such dispersions give green bodies, and hence sintered bodies, with controlled degrees of microinhomogeneities. In such applications the compositional inhomogeneity may be inherent in the barium titanate coform selected or, instead, may result from a small amount of a barium titanate coform with a selected composition being added to a barium titanate dispersion in order to achieve the desired compositional inhomogeneity. Since either divalent barium and/or tetravalent titanium deficient coforms can be formed according to this invention, the barium titanate based compositions of the present invention are also well suited for applications where compositional inhomogeneities are advantageous.

The preferred approach for producing the barium titanate based coforms is to heat slurries containing the hydrous tetravalent oxides with selected divalent oxides or hydroxides. After formation of the divalent titanates, the slurry still contains substantial quantities of hydrous $TiO_2$ and/or hydrous $SnO_2$, $ZrO_2$ or $HfO_2$. The slurry temperature and concentration are then adjusted and a stoichiometric excess of $Ba(OH)_2$ solution is then added under isothermal conditions. In order to ensure the complete conversion of the tetravalent oxides to their corresponding oxyanions, the slurry is preferably taken to a final, higher heat treatment.

Figure 2:
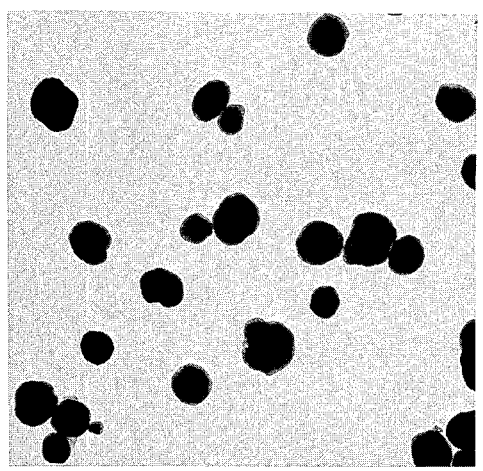
FIG. 2 is a transmission electron micrograph at 50,000x magnification of pure barium titanate powder which exhibits a morphology substantially similar to the morphology of the complex coform of FIG. 1.

The primary particle size and size distribution of the present invention are achieved whether the barium titanate coform is simply $BaTiO_3$ or instead is the more complex coform having the formula $Ba_{(1-x-x'-x")}Pb_xCa_{x'}Sr_{x"}Ti_{(1-y-y'-y")}Zr_ySn_{y'}Hf_{y'}O_3$. This becomes readily apparent from the transmission electron micrograph of the complex coform $Ba_{0.856}Pb_{0.097}Ca_{0.074}Ti_{0.830}Zr_{0.099}Sn_{0.071}O_3$ in FIG. 1 which shows the presence of predominantly single, substantially spherical primary particles, although a few firmly bound doublets and triplets are also present. The primary particle size of this coform is 0.18 microns with a narrow size distribution. A comparison of the complex barium titanate based coform of FIG. 1 with the transmission electron micrograph of pure barium titanate in FIG. 2 indicates that the morphologies of the barium titanate based compositions are very similar. Note that in both micrographs the particles are substantially spherical, unaggregated, submicron and uniformly sized. It may also be noted that the divalent to tetravalent cation mole ratio in this product, 1.027, is somewhat larger than the value 1.000±0.015 specified for stoichiometric products. This ratio can easily be reduced to the specified range by minor variations in the synthesis conditions without affecting morphology.

In order to evaluate the physical and chemical properties of the barium titanate based coforms according to the present invention, a variety of laboratory tests were performed. Image analysis was used to determine product primary partice size and primary particle size distribution. 500 to 1000 particles were sized in a plurality of TEM fields in order to determine the equivalent spherical diameters of the primary particles. Two or more touching particles were visually disaggregated and the sizes of the individual primary particles were measured. The equivalent spherical diameters were used to compute the cumulative mass percent distribution as a function of primary particle size. The median particle size, by weight, was taken to be the primary particle size of the sample. The quartile ratio, QR, defined as the upper quartile diameter (by weight) divided by the lower quartile diameter, was taken as the measure of the width of the distribution. Monodisperse products have a QR value of 1 and, for our testing purposes, products with QR values ranging from 1.0 to about 1.5 were classified as having narrow size distributions those with QR values ranging from 1.5 to about 2.0 were classified as having fairly narrow distributions while those with values substantially greater than 2.0 were classified as having broad size distributions. The quartile ratio of the barium titanate coforms of the present invention was determined to be between 1.0 to 1.5, indicating that the primary particles have a narrow size distribution.

Surface areas were calculated from the coform's primary particles and were found to be consistent with the surface areas determined by nitrogen adsorption, indicating that the primary particles are essentially nonporous. In cases where the $N_2$ surface area substantially exceeded the TEM surface area, it was found that the difference could be readily accounted for by the presence of unreacted high surface area hydrous oxides.

Since the coforms of the present invention have a narrow size distribution, average primary particle size was readily determined by sizing 20 to 30 particles. It was found that the relationship $D = 6\rho S$, where D is particle diameter (microns), $\rho$ is density (g/cc) and S is $N_2$ surface area (m²/g), could be used to obtain a good measure of the coform primary particle size. According to this formula it was found that the barium titanate based coforms have a primary particle size in the range between 0.05 and 0.4 microns, regardless of which coform composition was tested.

Product dispersibility of the coforms was assessed by comparing the primary particle sizes and size distributions determined by image analyses with the comparable values determined by sedimentation procedures. The sedimentation process gives the particle Stokes diameter which, roughly, corresponds to the equivalent spherical diameter. Two sedimentation methods, the Joyce Loebl Disc Centrifuge (Vickers Instruments, Ltd., London, U.K.) and the Micromeritics Sedigraph (Norcross, Georgia) were employed to determine cumulative mass percent distributions in terms of Stokes diameters from which the median Stokes diameters and the QR values were calculated.

In determining particle size by sedimentation, the powders were dispersed by a 15 to 30 minutes sonication in either water containing 0.08 g/L sodium tripolyphosphate at pH 10 or in isopropanal containing 0.08 or 0.12 weight percent Emphos PS-21A (Witco Organics Division, 520 Madison Ave., New York).

Since particle size determined by image analysis and by sedimentation depend on different principles, an exact correspondence in size by these two methods was not always obtained. Moreover, as already noted, in image analysis touching particles are visually disaggregated. In the sedimentation process bound or flocculated particles act as single entities. These entities arise because of the existence of some bonding (e.g., necking) between the primary particles to give cemented aggregates which cannot be readily broken down during the sonification process and because of less than optimum dispersion stability which leads to some flocculation. Thus, the QR values determined by sedimentation, as expected, were somewhat larger than those found by image analysis.

In the barium titanate based coforms of the present invention, the primary particle size determined by image analysis was in reasonable agreement with the primary particle size determined b sedimentation. The median particle size determined varied by no more than a factor of two. This demonstrates that the coforms are dispersible.

Two additional measures were used to assess dispersibility. In the first method, the mass fraction of the product having a Stokes diameter greater than one micron was used as a measure of the amount of hard-to-disperse aggregates. In the second method, a product was classified as being dispersible if the bulk of the primary particles in the TEM's were present as single particles. When substantial necking was observed the product was classified as aggregated. In each of these tests, the barium titanate based coforms were again classified as dispersible.

Product composition and stoichiometry of the coforms were determined by elemental analysis using inductively coupled plasma spectroscopy after sample dissolution. The precision of the analyses was about ±1%. The mole ratio of divalent cations to tetravalent cations of the coforms, regardless of the number or mole weight percent of the divalent and tetravalent cation substitutions, was 1.000±0.015. This ratio indicates that the barium titanate coforms of the present invention are stoichiometric.

The unique properties of the barium titanate based coforms are further illustrated by the following non-limiting examples.

Reagent grade chemicals or their equivalents were used throughout the Examples. The reagent grade Ba(OH)$_2$.8H$_2$O employed contained 1 mole percent Sr. Experiments have shown that Sr(II) is more readily incorporated than Ba(II) in the coform. For this reason all coforms described here contain Sr(II). This cation represents about 1 mole percent of the total divalent cation content of the coform. For simplicity, the Sr(II) mole fraction has been included in the Ba(II) mole fraction. Ba(OH)$_2$ and/or Sr(OH)$_2$ solutions, maintained at 70°-100° C., were filtered prior to use to remove any carbonates present. CaCO$_3$ was calcined at 800° C. to give CaO. The latter compound when contacted with water gives Ca(OH)$_2$. Pb(OH)$_2$ was prepared by neutralizing a Pb(NO$_3$)$_2$ solution with aqueous NH$_3$. The washed hydroxide wet cake was used in subsequent experiments.

Hydrous oxides of TiO$_2$, SnO$_2$ and ZrO$_2$, were prepared by neutralizing aqueous solutions of their respective chlorides with aqueous NH$_3$ at ambient temperatures. The products were filtered off and washed until chloride-free (as determined by AgNO$_3$) filtrates were obtained. The surface areas of the hydrous oxides, determined after drying at 110° C., were about 380, 290 and 150 for TiO$_2$, SnO$_2$ and ZrO$_2$, respectively. In addition coprecipitates of hydrous TiO$_2$ and ZrO$_2$ or hydrous TiO$_2$ and SnO$_2$ were prepared by neutralizing aqueous solutions of the chlorides of Ti(IV) and Sn(IV) or Ti(IV) and Zr(IV).

All experiments were performed in a 2 liter Autoclave. To prevent product contamination all wetted parts of the autoclave were coated with Teflon and every effort was made to exclude $CO_2$ from all parts of the system. $Ba(OH)_2$ or $Ba(OH)_2$ and $Sr(OH)_2$ solutions were introduced into the autoclave either by means of a high pressure pump or by rapidly discharging a solution of the hydroxide or hydroxides, contained in a heated bomb, into the autoclave by means of high pressure nitrogen. The contents of the autoclave were stirred at 1500 RPM throughout the syntheses process.

EXAMPLE 1

A calcium containing coform was prepared by hydrothermal treatment of 0.64 L of a slurry containing 0.20 moles of hydrous $TiO_2$ and 0.04 moles of $Ca(OH)_2$ to 200° C. The slurry was cooled and 0.46 L of 0.41M $Ba(OH)_2$ was added to the slurry at 120° C. The resulting slurry temperature was raised to 150° C. and held there for 60 minutes. The sample was filtered and the divalent cation concentrations in the filtrates were determined. The filter cake was dried and its surface area, nominal stoichiometry and morphological characteristics were determined.

| Filtrate g/L | | Cation Mole Ratio in Solids | Divalent/ Tetravalent Cation | Area |
|---|---|---|---|---|
| Ba | Ca | Ca:Ba:Sr:Ti: | Mole Ratio | $m^2/g$ |
| 2.62 | 0.446 | 0.127:0.842:0.019:1.00 | 0.988 | 12.0 |

| Primary particle Size (TEM) | Size Distribution |
|---|---|
| 0.15 micron | Narrow |

EXAMPLE 2

A lead containing coform was prepared by hydrothermal treatment of 0.64 L of a slurry containing 0.2 moles of hydrous $TiO_2$ and 0.04 moles PbO. 0.46 L of $Ba(OH)_2$ was added to the slurry at 150° C. The slurry was held at 150° C. for 60 minutes and then raised to an elevated temperature for complete conversion of the tetravalent oxides to the perovskite structures. The slurry was sampled and characterized. The results obtained are as follows:

| Filtrate g/L | | Cation Mole Ratio in Solids | Divalent/ Tetravalent Cation | Area |
|---|---|---|---|---|
| Ba | Pb | Ba:Pb:Sr:Ti: | Mole Ratio | $m^2/g$ |
| 10.6 | 2.74 | 0.810:0.173:0.024:1.000 | 1.007 | 11.5 |

| Primary particle Size (TEM) | Size Distribution |
|---|---|
| 0.07 micron | Narrow |

EXAMPLE 3

Complex coforms are formed in which the Ba(II) and Ti(IV) in $BaTiO_3$ are partially replaced by one or more divalent and tretravalent cations. A preheated $Ba(OH)_2$ solution was introduced into slurries heated to 150° C. or 120° C. containing the tretavalent hydrous oxides and presynthesized perovskites of Pb(II) and/or Ca(II). After holding at temperature for about 20 to 30 minutes, the slurries were raised to a final temperature to ensure that the tetravalent hydrous oxides converted to stoichiometric perovskites. The resulting slurry was characterized with the following results:

| | Cation Mole Ratio in Solids | Divalent/ Tetravalent Cation | Area |
|---|---|---|---|
| | Ba:Pb:Ca:Ti:Zr:Sn | Mole Ratio | $m^2/g$ |
| Sample 1 | 0.908:0.090:0.000:0.904:0.096:0.000 | 0.998 | 8.0 |
| Sample 2 | 0.881:0.000:0.123:0.881:0.119:0.000 | 1.004 | 12.2 |
| Sample 3 | 0.856:0.097:0.074:0.830:0.099:0.071 | 1.028 | 9.8 |

| | Primary Particle Size (TEM) | Size Distribution |
|---|---|---|
| Sample 1 | 0.14 micron | Very Narrow |
| Sample 2 | 0.2 microns | Narrow |
| Sample 3 | 0.2 microns | Narrow |

| | Image Analysis | | Sedimentation | |
|---|---|---|---|---|
| | size (microns) | QR | size (microns) | QR |
| Sample 1 | 0.12 | 1.33 | 0.24 | 2.2 |
| Sample 2 | 0.19 | 1.31 | 0.24 | 1.6 |
| Sample 3 | 0.18 | 1.25 | 0.24 | 1.5 |

The quantitative data for samples 2 and 3 corresponds well with the estimated particle size, size distribution and dispersibility data drawn from the transmission electron micrographs. Sample 1, however, as assessed by the QR value is only moderately dispersible. Nevertheless, the sedimentation data indicates that less than 5 weight percent of the material is present as aggregates having a size greater than 1 micron.

It can therefore be seen from the preceding examples and disclosure, that the coforms of barium titanate encompassed by the present invention include those dielectric compositions containing calcium and/or lead or multiple replacements for either or both of the divalent barium and tetravalent titanium cations which are uniquely characterized in that they are spherical, have a primary particle size in the range from 0.05 to 0.4 microns, a divalent to tetravalent mole ratio of 1.000±0.015, and a narrow particle size distribution. No prior art barium titanate based dielectric compositions which include calcium, lead or the complex forms disclosed herein possess these unique morphological and chemical characteristics.

It is understood that the preceding description is given merely by way of illustration and not in limitation of the invention and that various modifications may be made thereto without departing from the spirit of the invention as claimed.

We claim:

1. A substantially spherical powder composition having the formula $Ba_{(1-x')}Ca_{x'}Ti_{(1-y-y'-y'')}Sn_yZr_{y'}Hf_{y'}\cdot O_3$, wherein y, y', and y" have independent values ranging from zero to 0.3, the sum of (y+y'+y") is less than 0.4, and x' is greater than 0.01 and less than 0.4 and wherein (a) the median primary particle size as determined by image analysis, is in the range of 0.05 to 0.4 microns, (b) the primary particle size distribution, as determined by image analysis, has a quartile ratio less than or equal to 1.5, (c) the median primary particle size, as determined by image analysis and by sedimentation, agree within a factor of two, and (d) the particle size distribution, as determined by sedimentation, has a quartile ratio less than or equal to 2.0.

2. The substantially spherical powder composition of claim 1 wherein the mole ratio of (Ba+Ca)/(Ti+Sn+Zr+Hf) is 1.00±0.015.

3. The substantially spherical powder composition of claim 1 wherein the mole ratio of (Ba+Ca)/(Ti+Sn+Zr+Hf) is in the range between 0.9 and 1.1.

4. A substantially spherical powder composition having the formula $Ba_{(1-x)}Pb_{x'}Ti_{(1-y-y'-y'')}Sn_yZr_{y'}Hf_{y'}O_3$, wherein y, y', and y'' have independent values ranging from zero to 0.3, the sum of (y+y'+y'') is less than 0.4, and x' is greater than 0.01 and less than 0.4 and wherein (a) the median primary particle size as determined by image analysis, is in the range of 0.05 and 0.4 microns, (b) the primary particle size distribution, as determined by image analysis, has a quartile ratio less than or equal to 1.5, (c) the median primary particle size, as determined by image analysis and by sedimentation, agree within a factor of two, and (d) the particle size distribution, as determined by sedimentation, has quartile ratio less than or equal to 2.0.

5. The substantially spherical powder composition of claim 4 wherein the mole ratio of (Ba+Pb)/(Ti+Sn+Zr+Hf) is 1.00±0.015.

6. The substantially spherical powder composition of claim 4 wherein the mole ratio of (Ba+Pb)/(Ti+Sn+Zr+Hf) is in the range between 0.9 and 1.1.

7. A substantially spherical powder composition having the formula $Ba_{(1-x-x'-x'')}Pb_xCa_{x'}Sr_{x''}Ti_{(1-y-y'-y'')}Sn_yZr_{y'}Hf_{y''}O_3$, wherein x'', y, y', and y'' have independent values ranging from zero to 0.3, the sum of (y+y'+y'') is less than 0.4, x and x' each have independent values ranging from 0.01 to 0.3 and the sum of (x+x'+x'') is greater than 0.02 and less than 0.4 and wherein (a) the median primary particle size as determined by image analysis, is in the range of 0.05 to 0.4 microns, (b) the primary particle size distribution, as determined by image analysis, has a quartile ratio less than or equal to 1.5, (c) the median primary particle size, as determined by image analysis and by sedimentation, agree within a factor of two, and (d) the particle size distribution, as determined by sedimentation, has a quartile ratio less than or equal to 2.0.

8. The substantially spherical powder composition of claim 7 wherein the mole ratio of (Ba+Pb+Ca+Sr)/(Ti+Sn+Zr+Hf) is 1.000±0.015.

9. The substantially spherical powder composition of claim 7 wherein the mole ratio of (Ba+Pb+Ca+Sr)/(Ti+Sn+Zr+Hf) is in the range between 0.9 and 1.1.

* * * * *